United States Patent Office 3,682,652
Patented Aug. 8, 1972

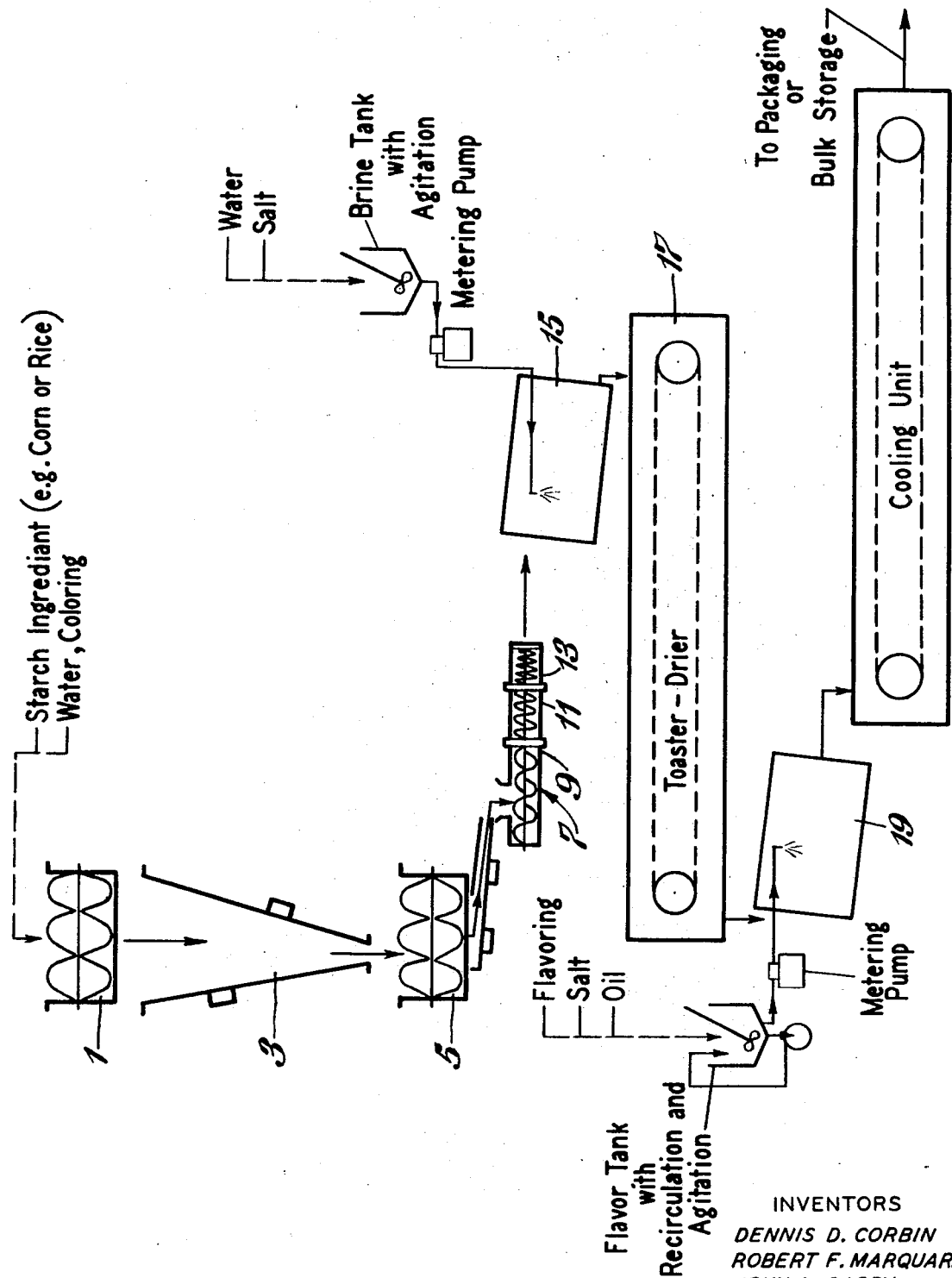

3,682,652
PROCESS FOR PREPARING A LOW CALORIE SNACK
Dennis D. Corbin, Robert F. Marquardt, and John Lester Gabby, Evansville, Ind., assignors to The Drackett Company, Cincinnati, Ohio
Filed Aug. 8, 1969, Ser. No. 848,467
Int. Cl. A23l *1/10*
U.S. Cl. 99—83      6 Claims

ABSTRACT OF THE DISCLOSURE

A process for preparing an edible, salted, extrusion-formed and expanded, cooked dough product, e.g., chips, sticks, curls, etc., in which the salt is added to the product in the form of a spray of an aqueous salt solution and the product is dried to remove the water.

BACKGROUND OF INVENTION

This invention relates to a process for preparing edible, salted, extrusion-formed and expanded, cellular, cooked dough products. In its more specific aspects, it concerns the preparation of a low calorie product of this character containing edible oil to an extent that does not exceed about 18% by weight of the product.

The latter aspect of this invention deals, for example, with the so-called "corn curl" or chip-type products which have a low calorie content. The reduction in calories is brought about by using only a relatively small quantity of fat. These products are made by extruder-cooking and expanding moisture containing blends of corn meal and then coating the expanded cellular product with a mixture of oil and salt. The corn meal is cooked in the process of passing it through the extruder under which it is subjected to extremely high pressure. The compression process, of course, raises the temperature and this results in the cooking of the product while passing through the machine.

The extruder is a conventional cereal puffing or expanding machine which involves a spiral gear type of feed where the space for the feed material is tapered, resulting in confinement and great increase in pressure on the feed as it passes therethrough. As the compressed mass is released through the extruder orifices, the pressure is released and the compressed mass puffs out or expands to form a cellular type of structure. This, then, is conventionally dried in an oven and sprayed with an edible oil containing salt and flavoring materials. It can then be further processed if desired.

Conventionally, these products contain from 25 to 45% by weight of oil in their finished form. One purpose in applying the salt in this fashion is to have it on the surface for its immediate taste impact. However, when the amount of oil employed is reduced to the 18% level, in an effort to prepare a low calorie product, there is insufficient oil to serve as a vehicle in applying the salt. Efforts have been made to apply the salt as part of the corn meal feed, but this interferes with the extrusion process and variable results are obtained from batch to batch.

It has now been found that the above difficulties may be avoided if the major portion of the salt is applied in the form of an aqueous salt solution onto the moist, expanded, cellular product prior to the drying. After the product is dried, it can then be coated with a more limited amount of oil, e.g., up to about 18% by weight and preferably between 5 and 15%. If desired, additional salt and/or other flavoring ingredients can be applied with the oil coating.

Although the present invention has particular application in the preparation of a low calorie product, in its broader aspects, it also may be used for ordinary type products of this character. In this broader aspect, the salt is applied to the extrusion-formed and expanded, cellular dough product in the form of an aqueous salt solution and preferably in the form of a spray of salt solution. The aqueous solvent is then removed leaving salt crystals uniformly distributed in the product.

It is accordingly an object of the present invention to provide a method for applying salt to an extrusion-formed and expanded, cellular dough product.

It is also an object of the present invention to provide a method for preparing a low calorie, edible, salted, extrusion-formed and expanded, cooked, cellular dough product.

Other and more detailed objects of this invention will be apparent from the following description and claims.

The one figure of drawing is a schematic drawing of a system that may be employed in the present invention.

STARTING MATERIAL

In carrying the process of the present invention, a dough is first formed from a vegetable meal or flour that is capable of being puffed or expanded on being compressed in an extruder and then extruded through its orifices. Any of a wide variety of flours or meals may be used for this purpose. Ordinarily, however, these will be employed in the form of a cereal meals or flours such as that obtained from corn, rice, wheat, rye, barley, or mixtures thereof, or mixtures of one or more of these and a high protein soybean product, all preferably having the same particle size. They are usually to be mixed with a small quantity of water which is just sufficient to form a dough. Although this quantity of water may vary quite widely depending upon the material employed, ordinarly it will constitute about 12 to 25% by weight of the meal or flour material.

The processing details from the preparation of products which are encompassed by the present invention can vary greatly depending on the materials employed and the products desired. For the purposes of convenience, there is described in detail procedures that are especially advantageous in preparing corn metal or corn flour based product or rice meal or rice flour based products. Furthermore, for purposes of clarity, this will be described with reference to the figure of the drawing.

PROCESSING

The essential processing steps may be conveniently described in seven (7) steps. These include:

(A) Blending
(B) Conditioning
(C) Cooking and expanding
(D) Salt application
(E) Toasting and drying
(F) Oil-flavor application
(G) Cooling These will be discussed below:

(A) Blending

This initial operation involves the compounding of the meal or flour chip formulation and combines the following ingredients:

(1) Starch ingredient (e.g., rice or corn)
(2) Coloring matter
(3) Water
(4) High protein ingredient (small quantity if desired)

These materials are blended in blender 1. This should be quite thorough and can be rigorous because there are no fragile raw materials with critical physical characteristics. After the materials are thoroughly mixed, they are conveyed to conditioning bin 3.

(B) Conditioning

The conditioning operation, which takes place in the conditioning bin 3, involves equilibration of the moisture throughout the blended formulation before introduction into the Cooking and Expanding operation. This serves to soften some of the starch granules and assists in the final gelatinization of the starch.

Conditioning is accomplished most satisfactorily by allowing the material to age or steep in the closed bin for at least several hours. This will ordinarily be from about 3 to 24 hours. The conditioned material is then conveyed to mixer 5 and then to extrusion-cooker 7.

(C) Cooking and expanding

Extrusion-cooker 7 is the place where the conditioned chip formulation is continuously cooked, expanded and sized to the finished chip. It consists essentially of a standard mixer screw section 9, a dwell screw section 11 and a cooking screw section 13.

The conditioned formulation is fed into the extruder-cooker 7 at a controlled rate, e.g. about 400 pounds per hour with a metering feeder. This will vary with the design of the machine. In some designs, a feed rate of up to about 800 pounds per hour can be employed. This controls the output of the extruder and the entire system. The material, which is in the form of a granular meal, fed to the extruder 7 first enters the standard screw section 9 where it receives a final conditioning with steam and water injection. The amount of subsequent cooking and expansion is governed by the plasticity (workability) of the dough in the extruder. This plasticity is controlled by the water and steam addition in this screw section 9. The quantity of moisture added by way of steam and water will vary depending on the condition of the feed. Typically, enough water and steam are added to bring the moisture content up to about 25% by weight of the meal.

Material from the standard screw section 9 is fed into the dwell screw section 11 for initial heating and final equilibration of added moisture.

From the dwell screw section 11, the dough which is formed is passed to the cooking-screw section 13 where it receives a severe compression and working, thus gelatinizing the starch and greatly increasing the product temperature and pressure. Back flow through each of the aforementioned screw sections is prevented by steam locks between each section.

Expansion occurs when the highly pressurized material is forced out of the cooking-screw section 13 into the atmosphere. Pressurized steam flashes off and inflates the starch mass to a porous matrix of tenderized dough which becomes firm with drying. The die provides the ports through which the cooked dough passes out of the extruder into the atmosphere. The shape of the die orifice controls the generalized shape of the extruded material.

As material is continuously forced through the die orifice, individual pieces are formed with a cut-off knife (not shown). The speed of the knives control the length of the pieces. The chips are formed at this point and ready for transfer to further operations.

The description of the cooking and expanding procedure above has been made with reference to the particular device depicted in the drawings and is given by way of illustration and not limitation. This procedure may obviously vary, depending on the type of machine employed. For example, in the above description it is indicated that water and steam is introduced into standard screw section 9 of the extruder-cooker 7. In other machines the moisture may be added to the granular corn meal prior to its introduction into the extruder.

A variety of extrusion-cookers suitable for the present purposes are commercially available. Thus, for example, the so-called "Wenger X–25 Cooker" manufactured by Wenger Mixer Mfg. of Sabetha, Kans. may be employed in this invention. Similarly, the "Sprout-Waldren Cooker-Extruder" manufactured by Sprout, Waldren and Company, Inc. of Munsey, Penn. and described in their advanced specification Sheet No. 224–A is also useful herein, as well as the extruder cookers shown in U.S. Pats. 2,842,072; 2,853,027 and 3,291,032. These patents and other references are incorporated herein by way of reference.

(D) Salt application

The completed chip first receives an application of salt in the form of a brine. This gives the most uniform distribution and a portion of the salt penetrates into the interior of the chip.

Brine salt is slurried into a brine near the saturation point and is metered onto the chips in brine spray section 15 as they are tumbled through the application "reel-a canted cylinder" designed to roll the chips for full surface coverage. The rate of brine application is governed by the output of the extruder. Ordinarily it will be added at a rate so that the salt content of the product will be in the range of about 0.25 to 2.5% by weight.

(E) Toasting and drying

After the chips are brined, excess water is removed to provide the cripsy texture. This is accomplished in toasting and drying section 17. Upon completion of this operation, the salt is taken into the internal part of the chip by means of the water already present. On drying, the salt is left distributed throughout the piece. Drying and toasting section 17 may be of a simple, tunnel-type, direct fired and/or hot air circulated unit with an endless belt for continuous drying.

(F) Oil-flavor application

The low calorie chip is completed with the application of an oil-flavor salt suspension to the chip surface, which is accomplished in oil-flavor application section 19. This application, made to the chip when it is hot from the oven, allows the oil to be absorbed into the interior of the chip. This leaves the flavoring and salt granules on the surface for initial mouth impact.

The suspension is applied in the same manner as the salt brine and is timed to the exteruder output. The quantity of oil added, as mentioned above, will not exceed about 18% by weight of the product. Preferably, this will lie in the range of 5 to 15% by weight.

(G) Cooling

With the application of the flavoring suspension completed, the chips are cooled to near ambient temperature conditions in cooling section 21. This assists in setting or partially solidifying the oil to prevent oil smearing on hands and containers, as well as holding flavoring and salt granules on the chip surface. Cooling is satisfactorily accomplished by circulating clean plant air or refrigerated air.

The following examples are given to further illustrate the present invention. It is to be understood, however, that the invention is not limited thereto.

EXAMPLE I

The moisture of a given lot of corn meal in the particle size range of from 40 to 60 mesh was measured and adjusted to 12½% moisture when necessary by the addition of water in the calculated amount. This product containing the 12½% moisture was stored in a closed container for from 3 to 24 hours to allow moisture equalization. This corn product was metered to an extruder at the rate of 400 pounds per hour, with the addition of additional moisture increasing the total to approximately 25%.

The extruder was preheated by means of a high pressure steam jacket, and after operation started the head of the extruder was cooled and maintained at a temperature of approximately 315° F. by controlling the flow of steam through the jacket. The product from the extruder in a moist condition was transferred to a reel where a measured quantity of saturated salt brine was sprayed onto the wet colletts at a rate which added 2% salt, based upon the weight of the dried colletts. The salted wet colletts were transferred to a hot air drier and dried using an air temperature of 375° F. to a moisture level of less than 2%. The hot dry colletts were transferred to a flavoring reel where a mixture of oil, salt, and cheese flavoring was added by means of a meter pump and spray nozzles so that the final product contained 15% fat, 9% cheese flavor, and 3½% salt. These flavored colletts were then cooled and packaged.

EXAMPLE II

Exactly the same procedure was used up to the point where the dried hot colletts were transferred to the flavor reel; and in this example a mixture of oil, dehydrated onion powder and salt was added to provide a final product containing 15% fat, 3½% salt, and 2% onion powder.

EXAMPLE III

In another extruder the moisture level of the original corn meal was adjusted to 18½% and allowed to stabilize for 3 hours. The stabilized corn meal was introduced into the extruder with additional water to bring the total to approximately 25%. The chips were extruded and carried through the rest of the process as indicated in Example I or II above, depending upon the flavor desired. In all cases the size and weight of the chip was controlled by the rate of addition of meal, the amount of moisture, the temperature of the extruder, the configurations of the screws and the size and shape of the orifices in the final die.

What is claimed is:
1. A process for preparing an edible, low calorie, salted, extrusion-formed and expanded, cellular, moisture containing dough product which comprises:
  (a) extruding through an orifice under pressure, an edible dough material;
  (b) allowing said extruded material to expand whereby extrusion-formed cellular explanded dough product is obtained;
  (c) applying a major portion of a salt solution to said extrusion-formed, cellular, expanded, moist dough product before drying;
  (d) drying said dough product; and
  (e) applying to said product from about 5 to 18% by weight of an edible oil.
2. A process according to claim 1 wherein said edible oil is flavored.
3. A process according to claim 1 wherein said flavoring ingredient includes salt.
4. A process according to claim 1 wherein the salt solution is applied in the form of a spray.
5. A process according to claim 1 wherein said dough material is made of corn meal.
6. A process according to claim 1 wherein said edible dough material is formed from a cereal product which has been subjected to an aging treatment.

References Cited
UNITED STATES PATENTS

| | | | |
|---|---|---|---|
| 2,653,097 | 9/1953 | Baer | 99—82 |
| 2,853,027 | 9/1958 | Graves | 99—81 X |
| 3,139,342 | 6/1964 | Linskey | 99—83 X |
| 3,484,250 | 12/1969 | Vollink et al. | 99—83 |
| 2,324,874 | 7/1943 | Peters | 99—83 |
| 1,989,480 | 1/1935 | Kellogg | 99—81 |

RAYMOND N. JONES, Primary Examiner

U.S. Cl. X.R.

99—81